(12) United States Patent
Fung

(10) Patent No.: US 10,075,043 B2
(45) Date of Patent: Sep. 11, 2018

(54) METHOD AND APPARATUS TO DRIVE A ROTOR AND GENERATE ELECTRICAL POWER

(71) Applicant: William P. Fung, Redwood City, CA (US)

(72) Inventor: William P. Fung, Redwood City, CA (US)

(73) Assignee: William P. Fung

( * ) Notice: Subject to any disclaimer, the term of this patent is extended or adjusted under 35 U.S.C. 154(b) by 460 days.

(21) Appl. No.: 14/959,998

(22) Filed: Dec. 4, 2015

(65) Prior Publication Data
US 2017/0163123 A1 Jun. 8, 2017

(51) Int. Cl.
| | |
|---|---|
| H02K 7/02 | (2006.01) |
| H02K 11/20 | (2016.01) |
| H02K 5/16 | (2006.01) |
| H02K 11/33 | (2016.01) |

(52) U.S. Cl.
CPC ............... *H02K 7/02* (2013.01); *H02K 5/16* (2013.01); *H02K 11/20* (2016.01); *H02K 11/33* (2016.01)

(58) Field of Classification Search
CPC ...... H02K 5/225; H02K 16/00; H02K 11/046; H02K 7/02
USPC ........... 310/71, 74, 154.01–154.49, 112–114
See application file for complete search history.

(56) References Cited

U.S. PATENT DOCUMENTS

| | | | | |
|---|---|---|---|---|
| 5,838,085 | A * | 11/1998 | Roesel, Jr. | F02N 11/04 310/113 |
| 2005/0236916 | A1* | 10/2005 | Uemura | H02K 1/2786 310/58 |
| 2010/0213778 | A1* | 8/2010 | Knutson | H02K 21/024 310/154.02 |
| 2012/0169063 | A1* | 7/2012 | Stegmann | H02K 3/47 290/55 |
| 2014/0300227 | A1* | 10/2014 | Kalev | H02K 7/025 310/74 |
| 2015/0130307 | A1* | 5/2015 | Sherman | H02K 7/02 310/74 |

* cited by examiner

*Primary Examiner* — Thanh Lam
(74) *Attorney, Agent, or Firm* — Ya-Fen Chen

(57) ABSTRACT

An electromagnetic power generator device and a method thereof for using balanced electromagnetic forces to drive one or more flywheel rotor assemblies on a fixed shaft and generating large amount of electrical power are provided. The electromagnetic power generator device includes a non-rotating shaft attached to a support frame, at least one flywheel rotor assembly, and at least one input driver plate assembly which is coupled to the flywheel rotor assembly via the non-rotating shaft penetrating through a first centered hole of a bearing of the flywheel assembly and a second centered hole of the input driver plate assembly.

21 Claims, 9 Drawing Sheets

METHOD AND APPARATUS TO DRIVE A ROTOR AND GENERATE ELECTRICAL POWER

CROSS-REFERENCE TO RELATED APPLICATIONS

This application claims benefit of U.S. provisional patent application Ser. No. 62/091,089, filed Dec. 12, 2014, which is herein incorporated by reference.

BACKGROUND OF THE INVENTION

Field of the Invention

Embodiments of the present invention generally relate to an apparatus and method of providing electrical energy harnessed from electrical current pulses. Specifically, the apparatus relates to the use of an electric pulse motor and an electromagnetic generator to generate electric power.

Description of the Related Art

An electric motor is an electrical machine that converts electrical energy into mechanical energy. Most motors operate through the interaction between an electric motor's magnetic field and winding currents to generate forces within the motor. A pulse motor uses width modulation of each pulse to control rotation speed of the pulse motor. On the other hand, conversion of mechanical energy into electrical energy is generally done by an electric generator. Generally, an electric motor and an electric generator are independent devices and a user cannot use a motor as a generator, or use a generator as a motor.

Conventional flywheel rotor systems are commonly used for energy storage and electrical power converting and regeneration by coupling with a separate electrical generator. They are also used for mechanically smoothing electrical power output. However, flywheel systems have not been developed to generate electrical power directly and in large quantity.

Electromagnets have been used together with electric motors and electric generators to generate and store electric power. An electromagnet generally consists of a coil of insulated wire wrapped around a magnetic iron core. The iron core can be made of a ferromagnetic material to increase the magnetic field created. The magnetic iron core concentrates the magnetic flux of the magnetic field and makes the electromagnet a more powerful magnet.

Electric motors coupled with electromagnets have the problems of generating dragging forces on the rotors of the motors as permanent magnets interacting with iron cores of the electromagnets. The dragging forces make the rotors difficult to move or start up. Flywheel-like electrical motors or generators usually only have one rotor with a rotating shaft, or several rotors that spin on the same direction, which cause "precession" problem of the rotating shaft. The precession is a change in the orientation of the rotational axis of a rotating body. The precession can cause shaking of the shaft, which in turn can produce noises and abrasive wear of the shaft and support. The precession can also cause the rotors to be less efficient. Therefore, there is a need for a novel method and apparatus to use a flywheel electromagnet system to drive a rotor on a shaft and generate large amount of electrical power.

SUMMARY OF THE INVENTION

The present invention generally provides an apparatus of a flywheel electromagnet system and a method thereof to use balanced electromagnetic forces to drive one or more rotors on a fixed shaft and generate large amount of electrical power. The invention aim to provide a novel flywheel type electromagnet system where a shaft supporting the flywheel type electromagnet system is not rotating while the flywheel is rotating by itself to act as a rotor and generate large amount of electrical power.

In one embodiment, an electromagnetic power generator device for generating electric power includes a non-rotating shaft attached to a support frame and at least one flywheel rotor assembly. The flywheel rotor assembly includes a circular ring, a circular nonferrous outer frame coaxially attached to the circular ring and positioned on an outer circumference of the circular ring, a circular nonferrous inner frame attached coaxially to the circular ring and positioned on an inner circumference of the circular ring, where the circular nonferrous outer frame comprises one or more external permanent magnets positioned outwardly and the circular nonferrous inner frame comprises one or more internal permanent magnets positioned inwardly.

The flywheel rotor assembly also includes a circular nonferrous plate, where the circular ring, the circular nonferrous outer frame, and the circular nonferrous inner frame are attached to a first side of the circular nonferrous plate and enclosing an outer circumference of the circular nonferrous plate. The flywheel rotor assembly further includes a bearing having a first centered hole where the nonrotating shaft passes through, where the bearing is positioned within a center portion of the circular nonferrous plate.

The electromagnetic power generator device also includes at least one input driver plate assembly which is coupled to the flywheel rotor assembly via the non-rotating shaft penetrating through the first centered hole of the bearing of the flywheel assembly and a second centered hole of the input driver plate assembly, and where the input driver plate assembly comprises one or more input driver coil assemblies arranged radially apart and attached on a first side of the input driver plate assembly. Each input driver coil assembly includes an iron core having a first end and a second end, and an input driver permanent magnet attached to the first end of the iron core, where the iron core is wrapped around with input driver coils from the first end to the second end.

In another embodiment, an electromagnetic power generator device for generating electric power is provided and includes a non-rotating shaft attached to a support frame, one or more flywheel rotor assemblies, and one or more input driver plate assembly which is coupled to the flywheel rotor assembly via the non-rotating shaft penetrating through the first centered hole of the bearing of the flywheel assembly and a second centered hole of the input driver plate assembly.

In still another embodiment, a method for generating electric power is provided and includes applying an initial start-up force to rotate a flywheel rotor assembly, triggering an optical sensor switch positioned on an input driver plate assembly, and generating an electric current through the input driver coils of an input driver coil assembly to generate a magnetic field. The method also includes generating a magnetic flux amplification by providing an attraction force of the magnetic field generated from the input driver coil assembly to attract the internal permanent magnets positioned inwardly apart on a circular nonferrous inner frame that is attached coaxially on an inner circumference of a circular ring of the flywheel rotor assembly, and providing a repulsion force from the input driver permanent magnet to repulse the internal permanent magnets and counterbalance the attraction force of the magnetic field where a neutral magnetic flux gap distance "D" is kept between the second end of the iron core and an inner edge of the circular nonferrous inner frame of the one flywheel rotor assembly to balance the attraction force and the repulsion force, wherein the internal permanent magnets and the input driver permanent magnets are positioned to face and pass each other freely even having the same magnetic polarity.

The method further includes generating a controlled magnetic flux pulse force from the one or more input driver coil assemblies of the input driver plate assembly to rotate the flywheel rotor assembly at a high rotating speed without hindrance, generating electric power by generating an electric current from the magnetic field of external permanent magnets positioned outwardly apart on a circular nonferrous outer frame that is attached coaxially on an outer circumference of the circular ring of the flywheel rotor assembly, and collecting electric power by an electricity output assembly having one or more output coils.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally provides an apparatus of a flywheel electromagnet system and a method thereof to use balanced electromagnetic forces and small amount of an input power to drive one or more rotors on a fixed shaft and generate large amount of electrical power. The invention is not an energy storage system but aim to provide a novel approach to use a small amount of input power to drive a flywheel to enable the flywheel to generate a large amount of electrical power directly without a separate electrical generator as in the conventional flywheel energy storage system to retrieve stored energy. As compared to conventional flywheel, embodiments of the invention provide a novel flywheel type electromagnet system where a shaft supporting the flywheel type electromagnet system is not rotating while the rest of the flywheel is rotating so as to function as a rotor to generate power. By spinning the rotor at high speed, current generated from output coils can be collected, and electric power is generated.

Figure 1A:
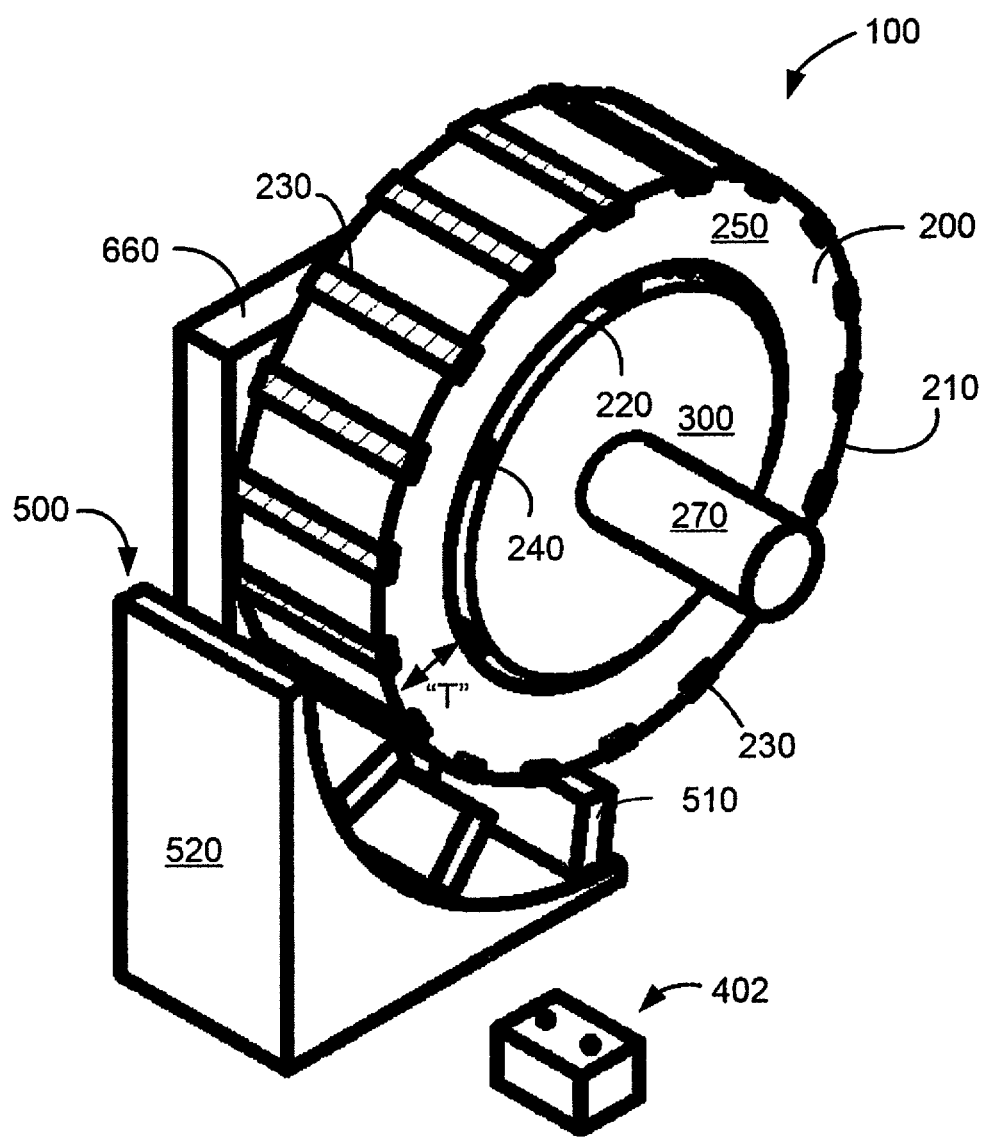
FIG. 1A shows a three-dimensional view of an electromagnetic power generator device in accordance with one or more embodiments of the invention.
Figure 4:
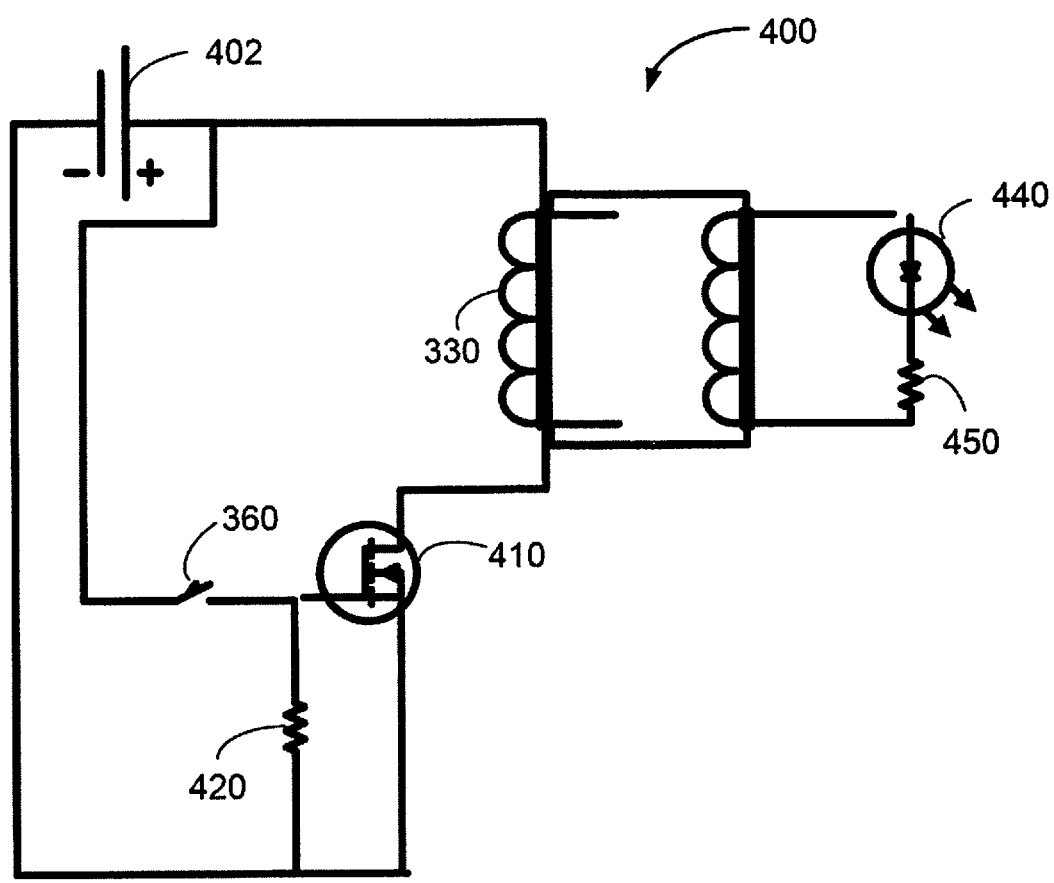
FIG. 4 shows a schematic diagram of a pulse driver circuit in accordance with one or more embodiments of the invention.

FIG. 1A is a three-dimensional view of an electromagnetic power generator device 100, in accordance with some embodiments of the invention. The electromagnetic power generator device 100 generally includes a flywheel rotor assembly 200, an input driver plate assembly 300, an input power source 402, and an electricity output assembly 500. In one embodiment, the input power source 402 is used to provide an input power or energy to the input driver plate assembly 300. For the purpose of clarity of the drawings, some electrical wires, which are shown in FIG. 4, are not shown in FIG. 1A and FIG. 1B. In another embodiment, the input driver plate assembly 300 is used to drive the flywheel rotor assembly 200 to generate rotational speed and generate electric energy, which can be extracted and output by the electricity output assembly 500.

In still another embodiment, the electromagnetic power generator device 100 is supported on a shaft 270, which is positioned non-rotatory within the flywheel rotor assembly 200 of the electromagnetic power generator device 100. For example, the shaft 270 of the electromagnetic power generator device 100 may be supported on a support frame 660 or any other types of a suitable support structure.

Figure 2:
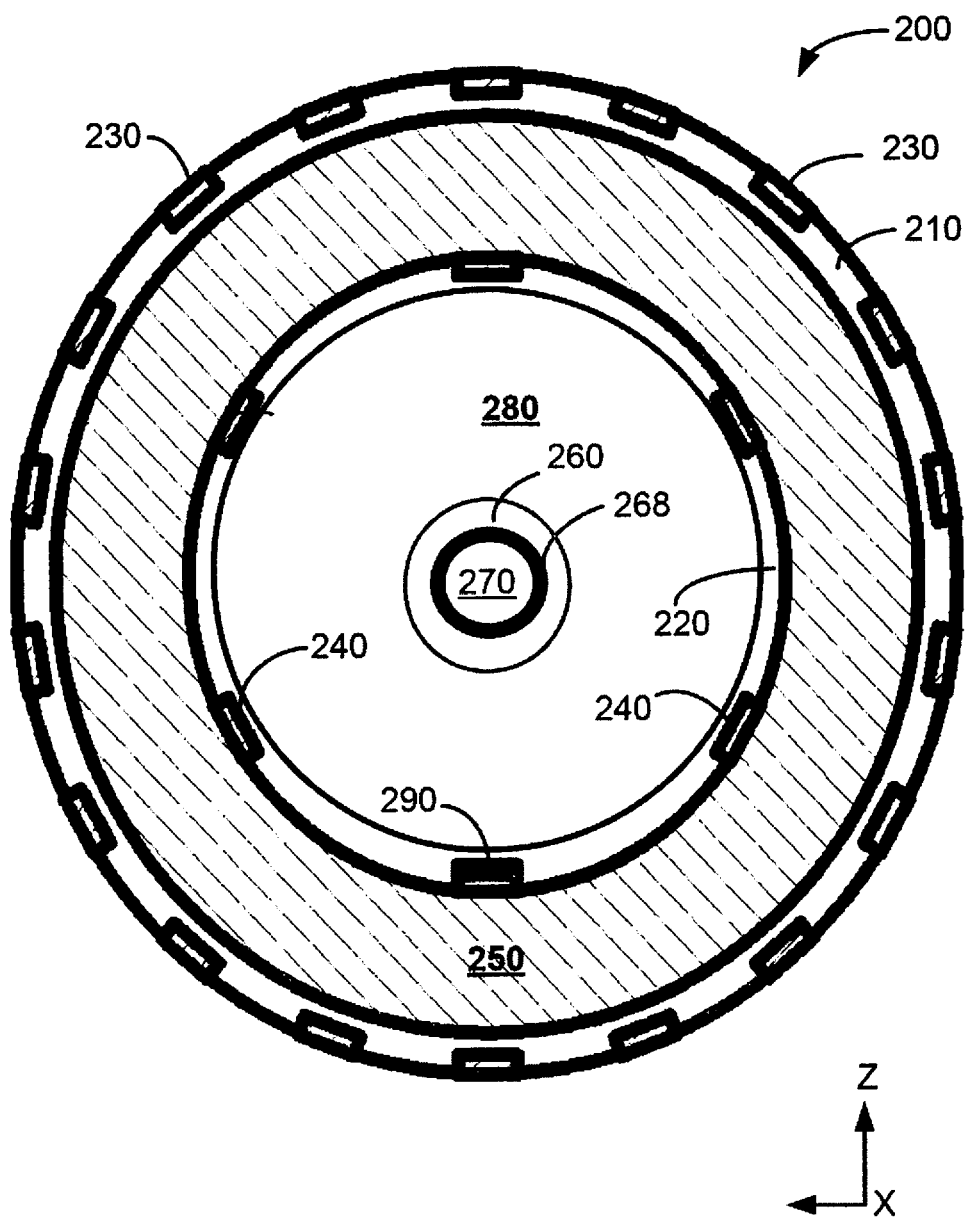
FIG. 2 shows a planar side view of a flywheel rotor assembly, viewed from a side opposite of an input driver plate assembly in accordance with some embodiments of the invention.

The flywheel rotor assembly 200 generally includes a circular ring 250 and a circular nonferrous plate 280 on one side of the circular ring 250, the side not shown in FIG. 1A, but is shown in FIG. 2. The outer portion of the circular ring 250 is covered by a circular nonferrous outer frame 210, and the inner portion of the circular ring 250 is covered by a circular nonferrous inner frame 220. In one embodiment, the circular nonferrous outer frame 210 of the flywheel rotor assembly 200 is positioned to the outer circumference of the circular ring 250, and the circular nonferrous inner frame 220 is positioned to the inner circumference of the circular ring 250.

In another embodiment, the circular nonferrous outer frame 210 is coaxially attached to the circular ring 250. In yet another embodiment, the circular nonferrous inner frame 220 is also coaxially attached to the circular ring 250. In some embodiments, the circular nonferrous outer frame 210 can be formed from a cylinder the shape to surround the outer circumference of the circular ring 250. The circular nonferrous outer frame 210 can be made from a metal material, such as aluminum or any other suitable metal materials, and can have a diameter "D" of about 4 inches or larger, for example, between about 5 inches and about 15 inches, such as about ten (10) inches. The circular nonferrous inner frame 220 can be made from a metal material, such as aluminum or any other suitable metal materials, and can have a radius "R2" (shown in FIG. 3C) of about 1.5 inches or larger, for example, between about 2 inches and about 6 inches, such as about 4.5 inches. Other dimensions and sizes can also be used.

One embodiment of the invention provides that the circular nonferrous outer frame 210 include a plurality of external permanent magnets 230 positioned spatially apart and outwardly along the outer circumference of the flywheel rotor assembly 200. In one example, the flywheel rotor assembly 200 may include two or more external permanent magnets 230, such as four (4) or more external permanent magnets 230, e.g., about twelve (12) or more external permanent magnets 230, or about twenty four (24) or more external permanent magnets 230, etc.

In another embodiment, the circular nonferrous inner frame 220 is contemplated to include a plurality of internal permanent magnets 240 positioned spatially apart and inwardly along the inner circumference of the flywheel rotor assembly 200. In one example, the flywheel rotor assembly 200 may include two or more internal permanent magnets 240, such as four (4) or more internal permanent magnets 240, e.g., about six (6) or more internal permanent magnets 240, about twelve (12) or more internal permanent magnets 240, or about twenty four (24) or more internal permanent magnets 240, etc.

As shown in FIG. 1A, the electricity output assembly 500 is positioned adjacent to the flywheel rotor assembly 200. The electricity output assembly 500 includes one or more output coils 510 supported on a coil support 520. The rotation of the external permanent magnets 230 on the flywheel rotor assembly 200 are used to generate an electrical current in the electricity output assembly 500. As the flywheel rotor assembly 200 rotates around the shaft 270, the speed of the rotation generates the cutting of the magnetic flux from the external permanent magnets 230, resulting in the generation and collection of electrical current by the output coils 510 of the electricity output assembly 500. The electrical current is generated by the passing of the external permanent magnets 230 across the output coils 510 of the electricity output assembly 500. In one embodiment, the shape of the output coils 510 matches the shape of the external permanent magnets 230 to increase the efficiency of collecting electric power by the output coils 510.

In general, the circular ring 250 of the flywheel rotor assembly 200 is used to provide weight to the flywheel rotor assembly 200 and thus may be made of a heavy weight materials in order to increase the amount of energy generated and/or stored by the electromagnetic power generator device 100. For example, the circular ring 250 may be made of a metal material, such as lead, stainless steel, and other metal materials, among others. In one example, the circular ring 250 may have radius "R1" (shown in FIG. 3C) of about 2.5 inches or larger (e.g., between about 5 inches and 10 inches, such as 5 inches), a width "W" of about 0.25 inch or larger, (e.g., about 0.75 inch or larger, such as between about 1 inch and about 3 inches) and a thickness "T" of about 0.1 inch or larger (e.g., between about 0.25 inch and about 1 inch). However, the dimension of the circular ring 250 is not limiting and can be scaled up or down accordingly.

In one example, the circular nonferrous outer frame 210 of the flywheel rotor assembly 200 includes eighteen (18) external permanent magnets 230, six (6) internal permanent magnets 240. In another example, the shape of the external permanent magnets 230 is a cuboid and each external permanent magnets 230 may be approximately 50 mm×15 mm×5 mm and have an approximate magnetic force of about twenty one hundred (2100) G-force. The circular nonferrous outer frame 210 is used to provide house the external permanent magnets 230 to the flywheel rotor assembly 200 and thus may be made of any nonferrous nonmagnetic material. For example, the circular nonferrous outer frame 210 may be made of aluminum, or any other suitable materials, such as lead, stainless steel, and other metal materials, among others.

As another example, each internal permanent magnet 240 may be approximately 15 mm×15 mm×5 mm and have an approximate magnetic force of thirty one hundred (3100) G-force. Other number, shapes and dimensions of the external permanent magnets 230 and the internal permanent magnets 240 can also be used and adjusted accordingly. The circular nonferrous inner frame 220 is used to provide house the internal permanent magnets 240 to the flywheel rotor assembly 200 and thus may be made of any nonferrous nonmagnetic material. For example, the circular nonferrous inner frame 220 may be made of aluminum, or any other suitable materials, such as lead, stainless steel, and other metal materials, among others.

Figure 1B:
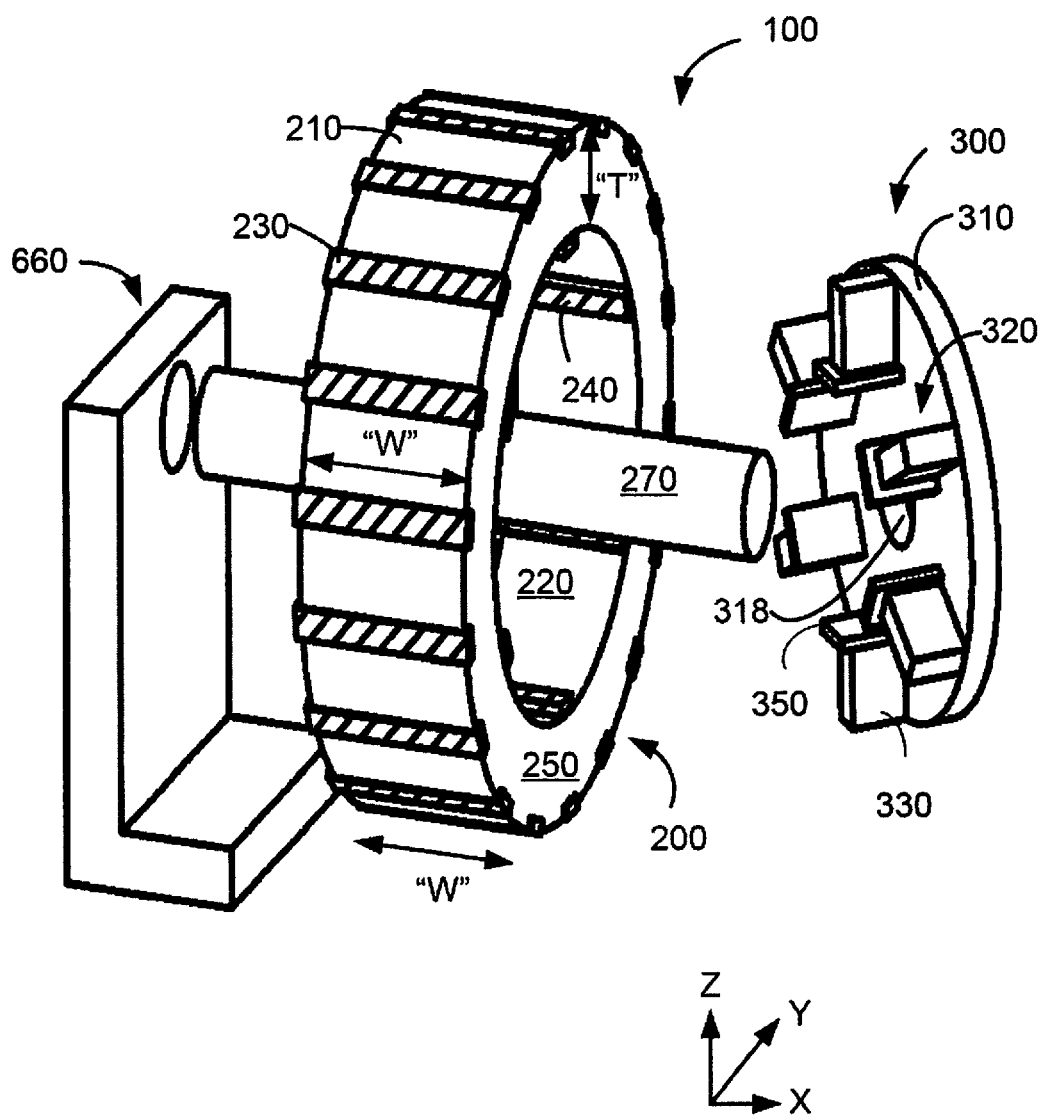
FIG. 1B shows a three-dimensional partial exploded view of an electromagnetic power generator device in accordance with some embodiments of the invention.

FIG. 1B is a three-dimensional partial exploded view of the electromagnetic power generator device 100, in accordance with some embodiments of the invention. As shown in FIGS. 1A and 1B, the input driver plate assembly 300 is coupled to the flywheel rotor assembly 200, such as being positioned to fit within the inner circumference of the circular ring 250 of the flywheel rotor assembly 200.

In the example shown in FIG. 1B, the input driver plate assembly 300 includes a mounting plate 310 and at least one input driver coil assembly 320 positioned on one side of the mounting plate 310, the side that faces flywheel rotor assembly 200. The number of input driver coil assembly 320 that can be mounted on the mounting plate 310 can varied, and can be two or more input driver coil assemblies 320 (e.g., four, six, eight or more input driver coil assemblies 320). The mounting plate 310 of the input driver plate assembly 300 includes a centered hole 318 which the shaft 270 can pass through. The mounting plate 310 may have radius "R3" (shown in FIG. 3C) of about 2 inches or larger (e.g., between about 2.5 inches and 10 inches, such as 3 inches).

FIG. 2 is a planar side view of the flywheel rotor assembly 200, viewed from a side opposite of the input driver plate assembly 300. As shown in FIG. 2, the flywheel rotor assembly 200 includes the circular ring 250, the circular nonferrous plate 280, and a bearing 260. In one embodiment, the bearing 260 is positioned within a center portion of the circular nonferrous plate 280 and is designed to allow the free rotation of the flywheel rotor assembly 200 around the shaft 270 via a centered hole 268 of the bearing 260.

In another embodiment, the circular ring 250, the circular nonferrous outer frame 210, and the circular nonferrous inner frame 220 are attached to a first side (the first side that is viewed and shown in FIG. 2) of the circular nonferrous plate 280. In addition, the circular ring 250, the circular nonferrous outer frame 210, and the circular nonferrous inner frame 220 are positioned to enclose an outer circumference of the nonferrous plate 280.

The circular nonferrous plate 280 may have a diameter of about 5 inches or larger, such as about 8 inches or larger. The circular nonferrous plate 280 adds to the total overall mass of the flywheel rotor assembly 200 and thus to the energy that can be generated and stored. Eighteen external permanent magnets 230 on the circular nonferrous outer frame 210 are shown in FIG. 2.

In one example, the outer diameter of the bearing 260 may be about two (2) inches and the inner diameter of the centered hole 268 of the bearing 260 may be about one (1) inch when the diameter of the circular ring 250 is about nine (9) inches. The size and dimension of the bearing 260 can be adjusted accordingly.

As shown in FIG. 2, a reflective object 290 can be positioned on one or more surfaces of the internal permanent magnets 240. The reflective object 290 is used together with an optical sensor switch 360 (shown in FIG. 3B) positioned next to at least one input driver coil assembly 320.

Referring back to FIG. 1B, in one embodiment, the electromagnetic power generator device 100 is assembled by passing the shaft 270 through the centered hole 268 of the bearing 260 within the flywheel rotor assembly 200 and then through the centered hole 318 of the mounting plate 310 within the input driver plate assembly 300. In the example of FIG. 1B, six (6) input driver coil assemblies 320 are mounted on the mounting plate 310. Each input driver coil assembly 320 may include an input driver permanent magnet 350 and input driver coils 330. In one embodiment, the first side of the circular nonferrous plate 280 of the flywheel rotor assembly 200 faces a side of the input driver plate assembly 300, the side having a number of input driver coil assemblies 320.

Figure 3A:
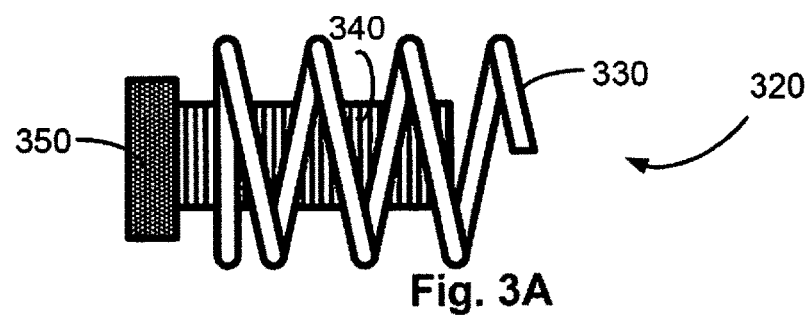
FIG. 3A shows an exploded view of the components of an input driver coil assembly in accordance with one or more embodiments of the invention.

FIG. 3A shows one example of the input driver coil assembly 320. Each input driver coil assembly 320 is composed of an iron core 340 having a first end and a second end, where the input driver permanent magnet 350 is attached to the first end of the iron core 340. In addition, the input driver coils 330 are wrapped around the iron core 340 from its first end to its second end. The length of the iron core 340 is shown as "L1". The input driver permanent magnet 350, input driver coils 330 and the iron core 340 are assembled to form an electromagnet construct. In one example, the input driver permanent magnet 350 is approximately 15 mm×15 mm×5 mm in size and has an magnetic force of about twenty one hundred (2100) G-force. As an example, the iron core 340 may be about 8 mm×8 mm with a length L1 of about 50 mm and has about twelve hundred (1200) windings of 30 AWG wire.

Figure 3B:
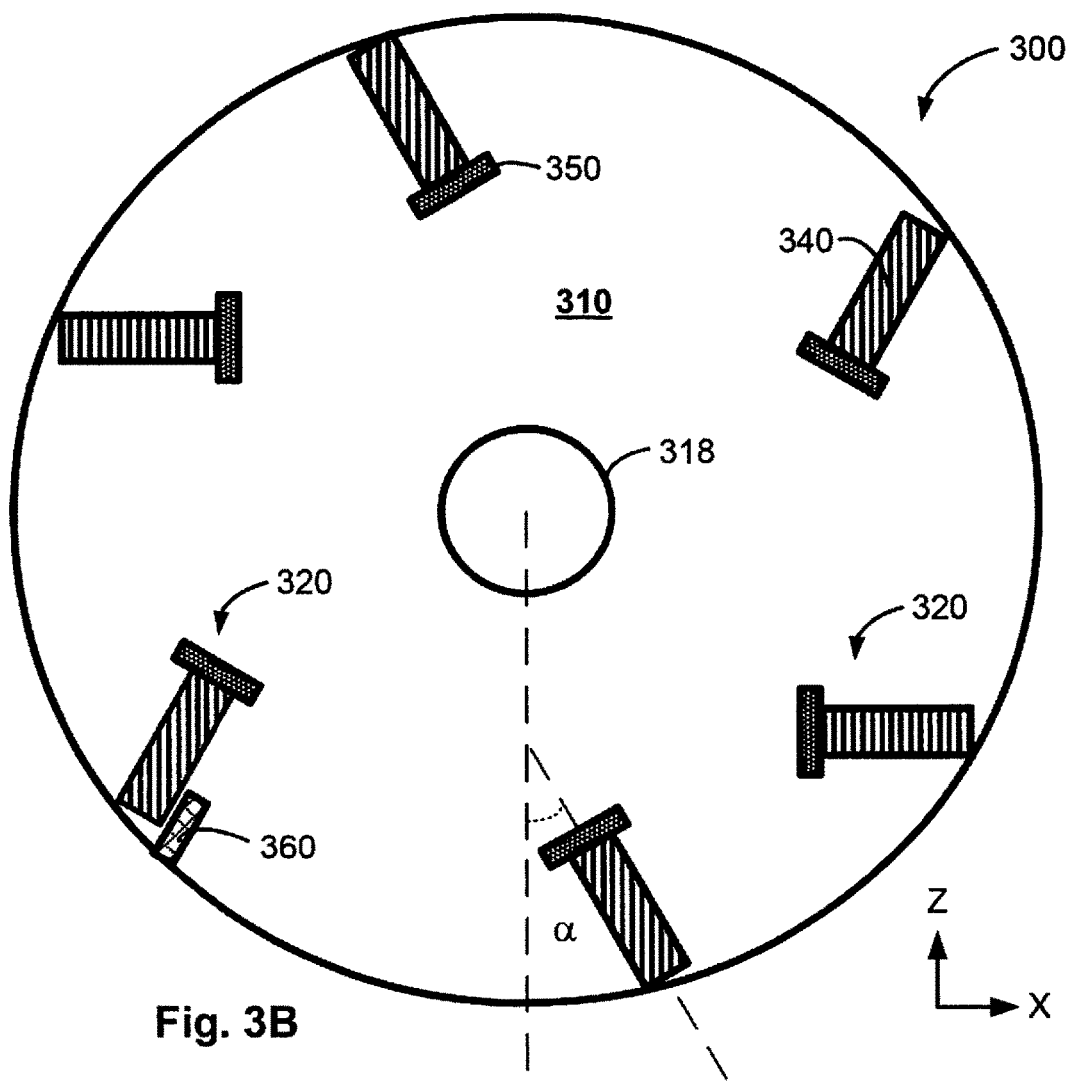
FIG. 3B shows a planar side view of an input driver plate assembly, viewed from one side of the an input driver plate assembly facing a flywheel rotor assembly in accordance with one or more embodiments of the invention.

FIG. 3B shows an example of the input driver plate assembly 300, viewed from one side of the input driver plate assembly 300 facing the flywheel rotor assembly 200. In the example of FIG. 3, the input driver plate assembly 300 includes six (6) input driver coil assemblies 320 positioned inwardly apart and radially at an angle "α". In one embodiment, the angle "α" is ranged from zero to 90 degree. In one example, the angle "α" is zero degree. In another example, the angle "α" is 45 degree.

In FIG. 3B, at least one optical sensor switch 360 is positioned next to at least one input driver coil assembly 320. The optical sensor switch 360 senses radiation reflected by the reflective object 290 on the surface of at least one internal permanent magnet 240 when electromagnet force from the input driver coil assembly 320 and the internal permanent magnets 240 are aligned to trigger a controlled magnetic flux pulse.

Figure 3C:
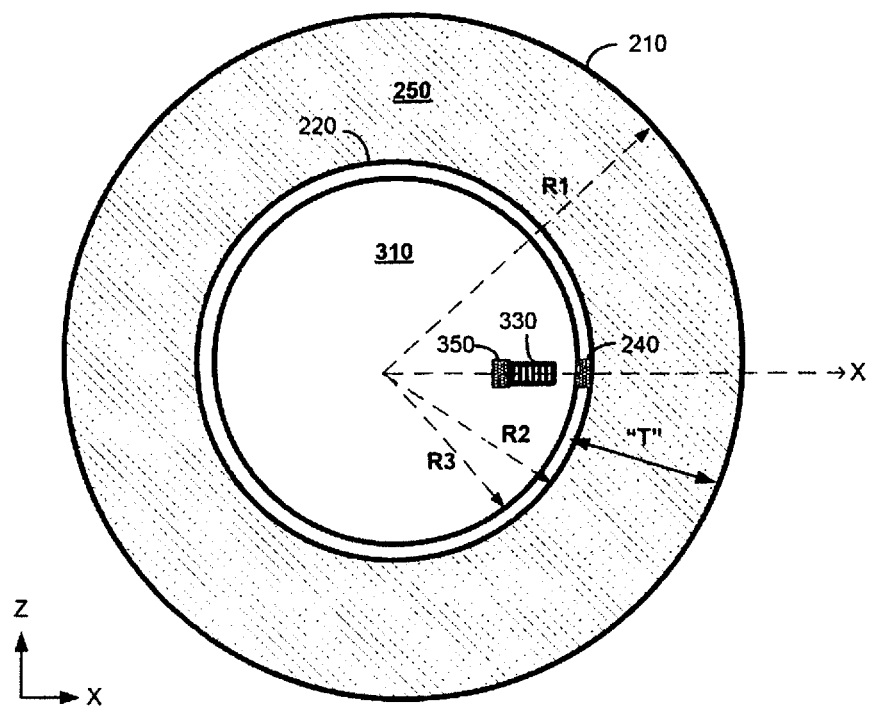
FIG. 3C shows a schematic view of the coupling of an input driver plate assembly within a circular ring of a flywheel rotor assembly in accordance with one example of the invention.

FIG. 3C illustrates coupling the input driver plate assembly 300 within the circular ring 250 of the flywheel rotor assembly 200 where one example of the input driver coil assembly 320 is shown to be positioned radially at the angle "α" of zero degree and aligned with one example of the internal permanent magnet 240. At the angle "α" of being zero degree, the first end of the input driver coil 330 is positioned at a radius of "R4" and the second end of the input driver coil 330 is positioned at edge of the mounting plate 310 (about the radius of "R3" of the mounting plate 310) from a radius center point of the mounting plate 310. Since the length of the iron core 340 is shown as "L1", thus at the angle "α" of zero degree, R3 equals to L1 plus R4. The radius "R1" of the circular ring 250 is adjusted to include the thickness "T" of the circular ring 250 and the radius "R2" of the circular nonferrous inner frame 220.

Figure 3D:
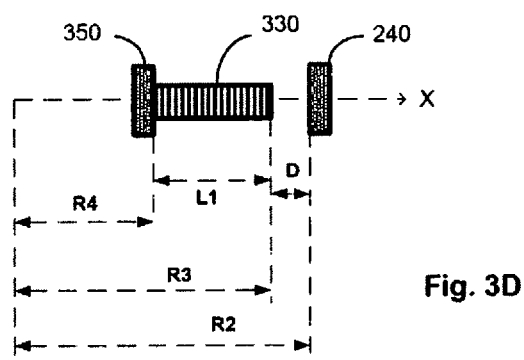
FIG. 3D shows the positioning of one exemplary input driver permanent magnet within an input driver plate assembly relative to an exemplary internal permanent magnet within a circular nonferrous inner frame in accordance with one or more embodiments of the invention.

FIG. 3D shows one example of positioning at least one input driver permanent magnet 350 within the input driver plate assembly 320 relative to at least one internal permanent magnet 240 within the circular nonferrous inner frame 220. In one embodiment, there is a gap distance "D" between the radius "R2" of the circular nonferrous inner frame 220 and the radius "R3" of the mounting plate 310, where D equals to R2 minus R3. In one example, the R1 is about 5 inches, R2 is about 3.5 inches, and R3 is about 3 inches, such that D is about 0.5 inch.

In another embodiment, the mounting plate 310 of the input driver plate assembly 300 is positioned within the circular nonferrous frame 220 of the flywheel rotor assembly 200 in order to align the electromagnet force of at least one driver coil assembly 320 with at least one internal permanent magnets 240 within the circular nonferrous frame 220 of the flywheel rotor assembly 200.

In still another embodiment, the internal permanent magnets 240 on the circular nonferrous inner frame 220 of the flywheel rotor assembly 200 and the input driver permanent magnets 350 on the input driver coil assemblies 320 of the input driver plate assembly 300 are positioned to face and pass each other in the same magnetic polarity. As a result, each input driver coil assembly 320 on the input driver plate assembly 300 is adjusted to a position where attraction forces of the internal permanent magnets 240 towards the iron cores 340 of the driver coil assemblies 320 and repulsion forces generated between two same polarity magnets 240 and 350, can be balanced out. The position is optimized such that the second end (with a radius of R3) of the iron core 340 of the input driver coil assembly 320 is kept at the distance "D" from an inner edge (with a radius of R2) of the circular nonferrous inner frame 220 of the one flywheel rotor assembly 200. The distance "D" equals to R2 minus R3. In one example, the distance "D" between the internal permanent magnets 240 and the tip of the input driver coils 330, is one eighteenth of an inch or larger, such as about one sixteenth of an inch or larger, or about 0.25 inches or larger, e.g., between about one sixteenth of an inch and one inch, or between about 0.25 inch and about 0.5 inch, e.g., about 0.375 inch.

Not wishing to be bound by theory, it is contemplated that when an electric potential is applied across the ends of the input driver coils 330, a current flows through the input driver coils 330 and generates a magnetic field that is greatly enhanced by the presence of the iron cores 340 and the input driver permanent magnets 350. The generated magnetic field from the input driver coil assemblies 320 provides powerful forces by interacting with the internal permanent magnets 240 to accelerate or maintain the spinning speed of the flywheel rotor assembly 200. In order to effectively accelerate or maintain the spinning speed of the flywheel rotor assembly 200, the pulse forces from the input driver plate assembly 300 have to be applied resonance of the rotation of the flywheel rotor assembly 200. In some embodiments, the input driver permanent magnet 350 is attached to the iron core 340 such that the magnetic polarity of the input driver permanent magnet 350 in contact with the iron core 340 is the same polarity as the polarity of the passing internal permanent magnet 240 closest to the iron core 340. The input driver permanent magnet 350 counteracts the attraction of the passing internal permanent magnet 240 towards the iron core 340, thus minimizing and essentially eliminating the rotating drag of the flywheel rotor assembly 200. This makes the flywheel rotor assembly 200 easy to start and rotate.

FIG. 4 illustrate one example of a pulse driver circuit 400 in accordance with one or more embodiments of the invention. The pulse driver circuit 400 is connected electrically to the input power source 402 and functions to only allow pulsed current to pass when the driver coil assemblies 320 and internal permanent magnets 240 are aligned. In some embodiments, a switch, such as the optical sensor switch 360 (e.g., Fairchild Reflective Opto-Transistor Model QRD 1114) shown in FIG. 3B, can be used.

The optical sensor switch 360 includes an infrared emitting diode and a detector that mounted side by side in a housing. The optical sensor switch 360 works by using the detector to detect radiation emitted from the infrared emitting diode and reflected by the reflective object 290. The optical sensor switch 360 is positioned at the same arrangement as a driver coil assembly 320 in such a manner to allow the detector to be aligned with the reflective object 290 on the surface of an internal permanent magnet 240. The detector senses the radiation reflected by the reflective object 290, and triggers a controlled magnetic flux pulse to be applied to the driver coil assemblies 320.

In one embodiment, the optical sensor switch 360 is electrically connected to the pulse driver circuit 400. In another embodiment, the optical sensor switch 360 is positioned close to at least one of the input driver coil assemblies of 320 of the input driver plate assembly 300. The pulse driver circuit 400 can have some parts separated from or mounted onto the input driver plate assembly 300.

In general, the pulse driver circuit 400 includes a pulse generation circuit, a plurality of the input driver coils 330, and an input electricity indicator. The pulse generation circuit generates electric pulses that resonance with the spinning of the flywheel rotor assembly 200. The input electricity indicator indicates whether there is pulse current passing through the input driver coils 330. The pulse driver circuit is connected to the input power source.

In the embodiment shown in FIG. 4, the pulse generation circuit includes the input power source 402, the optical sensor switch 360, an n-channel MOSFET 410, and a resistor 420. In some embodiments, the input power source 402 is a 12V DC battery that provides power for the pulse generation circuit. The n-channel MOSFET 410 switches the potential across the input driver coils 330. The input power source 402 is electrically connected to the input driver coils 330 of the input driver coil assemblies 320 of the input driver plate assembly 300. The output from the optical sensor switch 360 is being channeled to the gate of the MOSFET 410 to initiate the pulse signal feed to the input driver coils 330. The negative side of input power source 402 is connected to the source of the n-channel MOSFET 410.

The resistor 420 is connected across the gate and the source of the n-channel MOSFET 410 and provides protection of the pulse generation circuit of the possible sudden current changes. The resistivity of the resistor 420 can be about 10 k ohm or larger, for example, about 100 k ohm. One wired end of each input driver coil 330 is connected to the positive terminal of the input power source 402 and the other wired end of the input driver coil 330 is connected to the drain of the MOSFET 410.

In some embodiments, the input electricity indicator includes an LED 440 and a resistor 450. The anode of the LED 440 is connected to the positive terminal of the input power source 402 and the cathode of the LED 440 is connected to the drain of the n-channel MOSFET 410 with an in-series 1 k-ohm resistor 450. The LED is turned on when a potential is applied to the input driver coils 330. In an alternative embodiment, a portion of the output power generated by the electricity output assembly 500 may be used to provide input power, instead of using the input power source 402 (e.g., a 12-volt battery).

Figure 5:
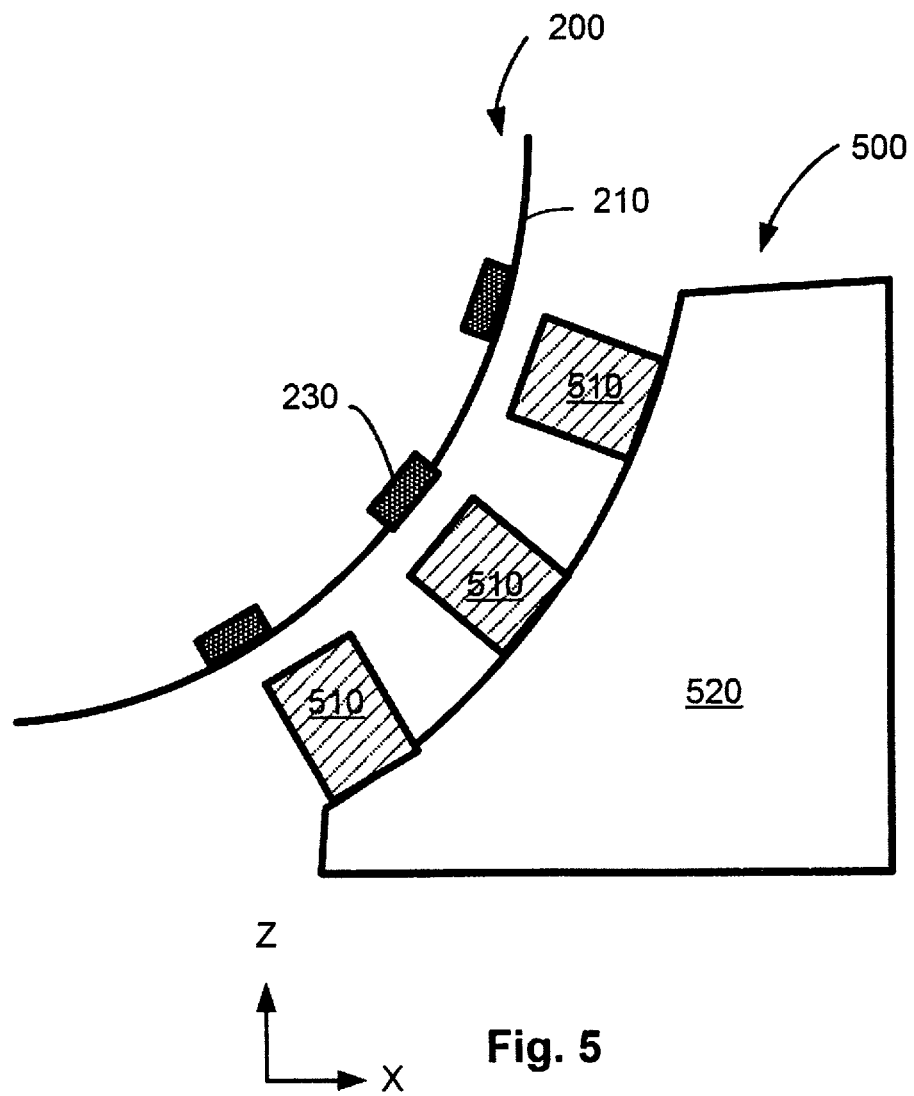
FIG. 5 shows a planar side view of an electricity output assembly in accordance with one or more embodiments of the invention.

FIG. 5 is a planar side view of the electricity output assembly 500. In one embodiment, the electricity output assembly 500 is positioned adjacent to the outer circumference of the flywheel rotor assembly 200. The electricity output assembly 500 may include the coil support 520 and one or more output coils 510. The output coils 510 may be composed of 24 AWG magnetic wires with about 1300 windings. The coil support 520 accommodates the output coils 510. The surface of the output coils 510 closest to the flywheel rotor assembly 200 is positioned about 0.25 inches away from the outer circumference of the flywheel rotor assembly 200. In some embodiments, the sizes of the output coils 510 is approximately 2.5 inch×2 inches×0.875 inch.

As the flywheel rotor assembly 200 rotates around the shaft 270, the cutting of the magnetic flux from the external permanent magnets 230 on the output coils 510 generates an electrical current in the wire of the output coils 510. In one embodiment, several output coils 510 might be used around the circumference of the flywheel rotor assembly 200 in order to increase the power generation. In the example as shown in FIG. 5, three output coils 510 are used resulting in a total output of the electricity output assembly 500 to be 35 volts AC when the flywheel rotor assembly 200 is running about 250 RPM rotating speed. In an alternative example, a portion of the output power being generated by the flywheel rotor assembly 200 may be used to power the pulse driver circuit 400.

Figure 6:
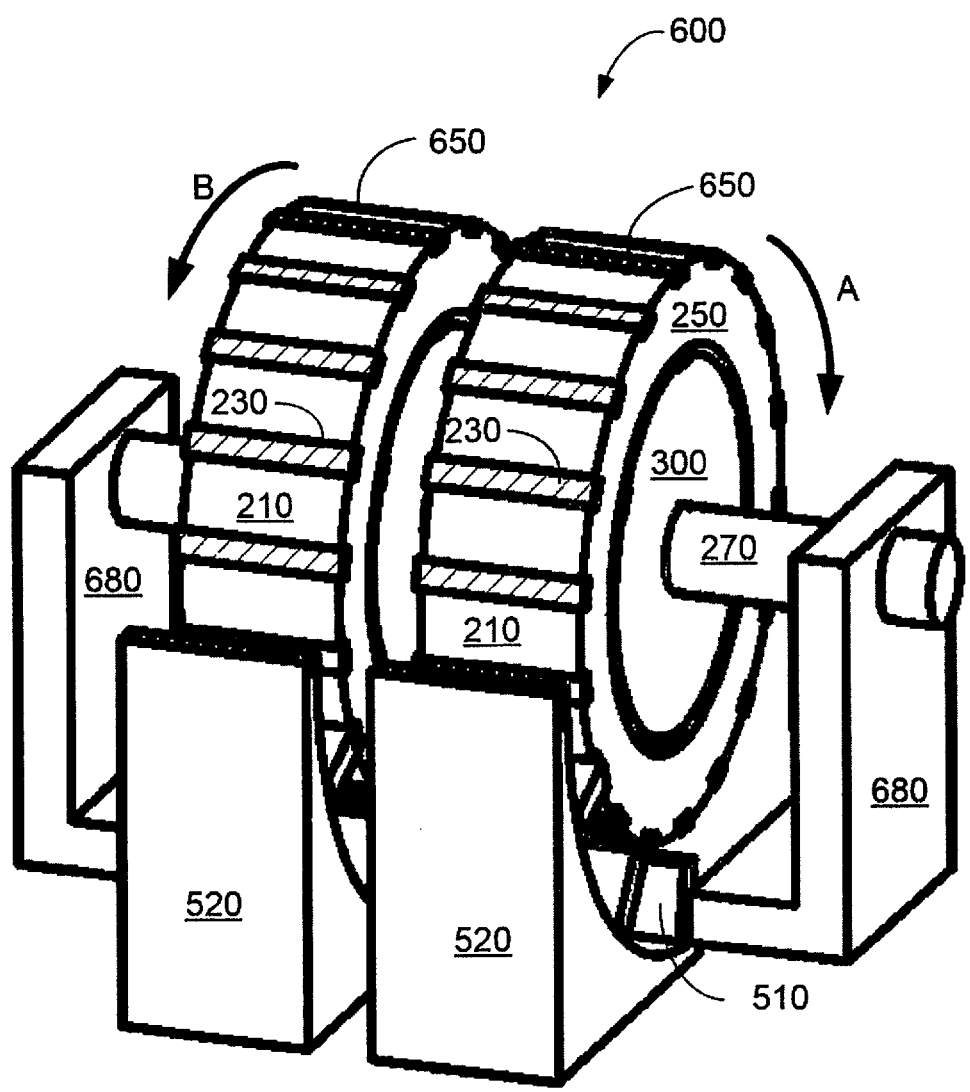
FIG. 6 shows a three-dimensional schematic view of a dual-rotor type of another example of an electromagnetic power generator device in accordance with one or more embodiments of the invention.

FIG. 6 is a three-dimensional schematic view of a dual-rotor type of another example of an electromagnetic power generator device 700 in accordance with one or more embodiments of the invention. The electromagnetic power generator device 700 includes two flywheel rotor assemblies 750 rotating in opposite direction (e.g., arrow A around the shaft 270 and arrow B around the shaft 270) to eliminate procession problem. Each flywheel rotor assembly 750 has its own input driver plate assembly 300 positioned within their central recess regions of the circular nonferrous inner frame 220.

The two flywheel rotor assemblies 750 may be rotated in counter directions in order to reduce and essentially eliminated gyroscopic effect often observed on a single rotating rotor assembly. The shaft 270 passes through the central holes of the two flywheel rotor assemblies 750 and is supported by a support frame 680. The support frame 680 may be vertical arms or some other support mechanism, such as a housing enclosure. In an alternative embodiment, a portion of the total out power being generated by the dual-rotor electric generator device 700 may be used to power the pulse driver circuits 400.

Figure 7:
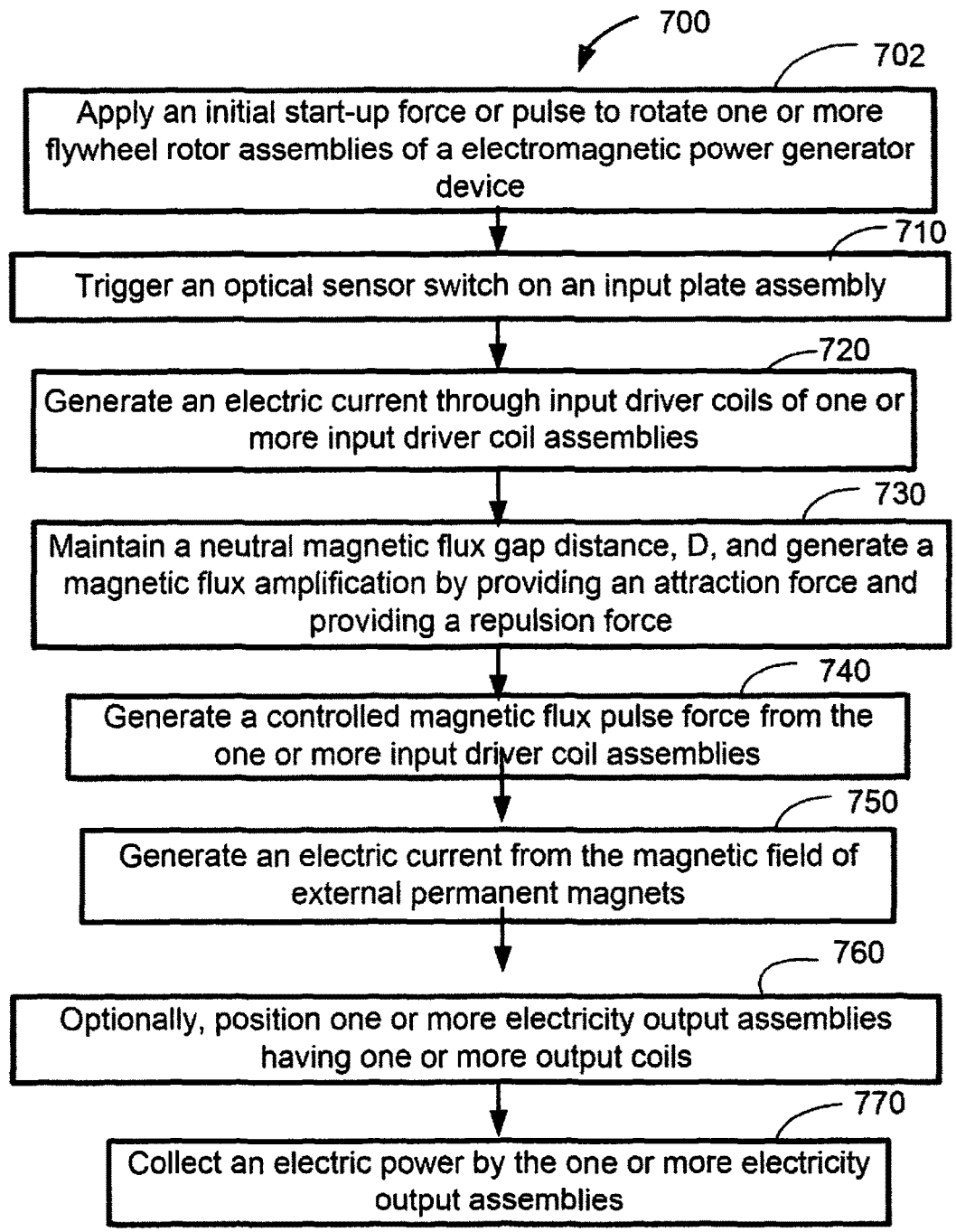
FIG. 7 shows a flow diagram illustrating a method for using one or more electromagnetic power generator devices to generate electricity in accordance with some embodiments.

FIG. 7 is a flow diagram illustrating a method 700 of using one or more electromagnetic power generator devices to generate electricity in accordance with one or more embodiments. The method 700 include an optional step 702 of applying an initial start-up force to rotate a flywheel rotor assembly, and a Step 710 of triggering an optical sensor switch positioned on an input driver plate assembly. The initial startup force might be applied by hand, a magnetic flux pulse, or by some other mechanical means. The startup force starts the flywheel rotor assembly to rotate about a shaft pass through the center of the flywheel rotor assembly and the center of the input driver plate assembly. Rotating one or more flywheel rotor assemblies can trigger an optical sensor switch of a pulse driver circuit, which in turn closes a pulse generation circuit, resulting in a controlled magnetic flux pulse from one or more driver coil assemblies of the input driver assembly 300.

At Step 720, an electric current is generated through the input driver coils of an input driver coil assembly to generate a magnetic field. The driver input coils wrap around an iron core having a first end and a second end, and an input driver permanent magnet is attached to the first end of the iron core.

At Step 730, a neutral magnetic flux gap distance "D" is maintained between the second end of the iron core and an inner edge of the circular nonferrous inner frame of the one flywheel rotor assembly to balance the attraction force and the repulsion force. In one embodiment, the internal permanent magnets and the input driver permanent magnets are positioned to face and pass each other in the same magnetic polarity.

In addition, a magnetic flux amplification is generated by providing an attraction force from the magnetic field generated from the input driver coil assembly to attract internal permanent magnets positioned inwardly apart on a circular nonferrous inner frame that is attached coaxially on an inner circumference of a circular ring of the flywheel rotor assembly. Further, a repulsion force is provided from the input driver permanent magnet to repulse the internal permanent magnets and counterbalance the attraction force of the magnetic field.

At Step 740, a controlled magnetic flux pulse force from the one or more input driver coil assemblies of the input driver plate assembly is generated to rotate the flywheel rotor assembly at a high rotating speed without hindrance. The rotating flywheel rotor assembly driven by the controlled magnetic flux pulses eventually reaches an operating rotational velocity.

At Step 750, an electric power is generated by generating an electric current from the magnetic field of external permanent magnets positioned outwardly apart on a circular nonferrous outer frame that is attached coaxially on an outer circumference of the circular ring of the flywheel rotor assembly. For example, an output current is generated in the one or more output coils positioned circumferentially adjacent to the rotating flywheel rotor assembly.

At Step 760, optionally, one or more electricity output assemblies having on or more output coils are positioned near the flywheel rotor assembly within the flywheel type electromagnet system. At Step 770, the electric power is collected by the one or more electricity output assembly having one or more output coils.

Embodiments of the invention provide a flywheel type electromagnet system and a method of using the flywheel type electromagnet system for generating large amount of electric power. In one embodiment, the flywheel type electromagnet system includes one flywheel per unit mounted in a perpendicular position on a non-rotating shaft. In another embodiment, the flywheel type electromagnet system includes two flywheels mounted side by side on a non-rotating shaft where the two flywheels may rotate and spin in the same or opposite direction. In a preferred embodiment, the two flywheels are spinning in an opposite rotating direction to each other to eliminate the precession problem during flywheel rotation.

Additional flywheels can be added to the flywheel type electromagnet system to include three, four or any other additional number of flywheels installed on a single fix-positioned and non-rotating shaft to generate higher total electrical power output. For example, a flywheel type electromagnet system can be modified to include multiple units of two flywheel pair, each flywheel pair having two flywheels to rotate in opposite direction.

Accordingly, the invention provides the electromagnetic power generator device 100 and a method thereof for using balanced electromagnetic forces to drive one or more flywheel rotor assemblies 200 on a fixed shaft and generate large amount of electrical power. The electromagnetic power generator device includes a non-rotating shaft attached to a support frame, at least one flywheel rotor assembly, and at least one input driver plate assembly which is coupled to the flywheel rotor assembly via the non-rotating shaft penetrating through a first centered hole of a bearing of the flywheel assembly and a second centered hole of the input driver plate assembly.

While the foregoing is directed to embodiments of the present invention, other and further embodiments of the invention may be devised without departing from the basic scope thereof, and the scope thereof is determined by the claims that follow.

The invention claimed is:

1. An electromagnetic power generator device for generating electric power, comprising:
   a non-rotating shaft attached to a support frame;
   at least one flywheel rotor assembly comprising:
      a circular ring;
      a circular nonferrous outer frame coaxially attached to the circular ring and positioned on an outer circumference of the circular ring;
      a circular nonferrous inner frame attached coaxially to the circular ring and positioned on an inner circumference of the circular ring, wherein the circular nonferrous outer frame comprises one or more external permanent magnets positioned outwardly, and the circular nonferrous inner frame comprises one or more internal permanent magnets positioned inwardly;
      a circular nonferrous plate, wherein the circular ring, the circular nonferrous outer frame, and the circular nonferrous inner frame are attached to a first side of the circular nonferrous plate and enclosing an outer circumference of the circular nonferrous plate; and
   at least one input driver plate assembly which is coupled to the one flywheel rotor assembly via the non-rotating shaft, wherein the input driver plate assembly comprises one or more input driver coil assemblies arranged radially apart and attached on a first side of the input driver plate assembly, and wherein the input driver coil assembly comprises:
      an iron core having a first end and a second end, the iron core being wrapped around with input driver coils from the first end to the second end; and
      an input driver permanent magnet attached to the first end of the iron core.

2. The electromagnetic power generator device of claim 1, further comprising:
   an input power source electrically connected to the input driver coils of the one or more input driver coil assemblies of the input driver plate assembly.

3. The electromagnetic power generator device of claim 2, further comprising:
a pulse driver circuit connected electrically to the input power source.

4. The electromagnetic power generator device of claim 3, further comprising:
an optical sensor switch positioned close to one of the one or more input driver coil assemblies of the one input driver plate assembly, wherein the optical sensor switch is electrically connected to the pulse driver circuit.

5. The electromagnetic power generator device of claim 1, wherein each input driver plate assembly comprises six (6) input driver coil assemblies.

6. The electromagnetic power generator device of claim 1, further comprising:
a support frame.

7. The electromagnetic power generator device of claim 1, wherein the first side of the circular nonferrous plate of the one flywheel rotor assembly faces the first side of the input driver plate assembly.

8. The electromagnetic power generator device of claim 1, wherein the one or more input driver coil assemblies are attached radially apart on the input driver plate assembly at an "α" angle, where a is ranged from 0° to 90°.

9. The electromagnetic power generator device of claim 8, wherein "α" equals to 0°.

10. The electromagnetic power generator device of claim 1, wherein the internal permanent magnets on the circular nonferrous inner frame of the at least one flywheel rotor assembly and the input driver permanent magnets on the input driver coil assemblies of the at least one input driver plate assembly are positioned to face and pass each other in the same magnetic polarity.

11. The electromagnetic power generator device of claim 1, wherein the second end of the iron core of the one input driver coil assembly is kept at a distance "D" from an inner edge of the circular nonferrous inner frame of the one flywheel rotor assembly.

12. The electromagnetic power generator device of claim 11, wherein the distance "D" equals to one sixteenth of an inch to one inch.

13. The electromagnetic power generator device of claim 1, further comprising:
an electricity output assembly with one or more output coils.

14. An electromagnetic power generator device for generating electric power, comprising:
a non-rotating shaft attached to a support frame;
one or more flywheel rotor assemblies, wherein one flywheel rotor assembly comprising:
a circular ring;
a circular nonferrous outer frame coaxially attached to the circular ring and positioned on an outer circumference of the circular ring;
a circular nonferrous inner frame attached coaxially to the circular ring and positioned on an inner circumference of the circular ring, wherein the circular nonferrous outer frame comprises one or more external permanent magnets positioned outwardly, and the circular nonferrous inner frame comprises one or more internal permanent magnets positioned inwardly;
a circular nonferrous plate; wherein the circular ring, the circular nonferrous outer frame and the circular nonferrous inner frame are attached to a first side of the circular nonferrous plate and enclosing an outer circumference of the circular nonferrous plate; and
a bearing having a first centered hole where the non-rotating shaft passes through, where the bearing is positioned within a center portion of the circular nonferrous plate;
one or more input driver plate assemblies, wherein one input driver plate assembly is coupled to the one flywheel rotor assembly via the non-rotating shaft penetrating through the first centered hole of the bearing of the one flywheel assembly and a second centered hole of the one input driver plate assembly, and
wherein the one input driver plate assembly comprises one or more input driver coil assemblies arranged radially apart and attached on a first side of the input driver plate assembly, and
wherein the input driver coil assembly comprises:
an iron core having a first end and a second end, the iron core being wrapped around with input driver coils from the first end to the second end; and
an input driver permanent magnet attached to the first end of the iron core.

15. The electromagnetic power generator device of claim 14, further comprising:
an input power source electrically connected to the input driver coils of the one or more input driver coil assemblies of the one input driver plate assembly.

16. The electromagnetic power generator device of claim 14, further comprising:
a pulse driver circuit connected electrically to the input power source.

17. The electromagnetic power generator device of claim 14, wherein one or more flywheel rotor assemblies comprises two or more flywheel rotor assemblies rotating in opposite directions.

18. A method for generating electric power, comprising:
triggering an optical sensor switch positioned on an input driver plate assembly;
generating an electric current through the input driver coils of an input driver coil assembly to generate a magnetic field, wherein the driver input coils wrap around an iron core having a first end and a second end, and wherein an input driver permanent magnet is attached to the first end of the iron core;
providing a repulsion force from the input driver permanent magnet to repulse the internal permanent magnets and counterbalance the attraction force of the magnetic field where a neutral magnetic flux gap distance "D" is kept between the second end of the iron core and an inner edge of the circular nonferrous inner frame of the one flywheel rotor assembly to balance the attraction force and the repulsion force;
generating a magnetic flux amplification by providing an attraction force from the magnetic field generated from the input driver coil assembly to attract internal permanent magnets positioned inwardly apart on a circular nonferrous inner frame that is attached coaxially on an inner circumference of a circular ring of the flywheel rotor assembly, wherein the internal permanent magnets and the input driver permanent magnets are positioned to face and pass each other in the same magnetic polarity; and
generating a controlled magnetic flux pulse force from the one or more input driver coil assemblies of the input driver plate assembly to rotate the flywheel rotor assembly at a high rotating speed.

19. The method of claim 18, further comprising:
applying an initial start-up force to rotate a flywheel rotor assembly.

20. The method of claim 18, further comprising:
generating electric power by generating an electric current from the magnetic field of external permanent magnets positioned outwardly apart on a circular nonferrous outer frame that is attached coaxially on an outer circumference of the circular ring of the flywheel rotor assembly.

21. The method of claim 18, further comprising:
collecting electric power by an electricity output assembly having one or more output coils.

* * * * *

UNITED STATES PATENT AND TRADEMARK OFFICE
CERTIFICATE OF CORRECTION

PATENT NO. : 10,075,043 B2
APPLICATION NO. : 14/959998
DATED : September 11, 2018
INVENTOR(S) : William P. Fung It is certified that error appears in the above-identified patent and that said Letters Patent is hereby corrected as shown below:

In the Specification

Column 10 Line 42 through Line 63 should read:
Figure 6 is a three-dimensional schematic view of a dual-rotor type of another example of an electromagnetic power generator device 600 in accordance with one or more embodiments of the invention. The electromagnetic power generator device 600 includes two flywheel rotor assemblies 650 rotating in opposite direction (e.g., arrow A around the shaft 270 and arrow B around the shaft 270) to eliminate procession problem. Each flywheel rotor assembly 650 has its own input driver plate assembly 300 positioned within their central recess regions of the circular nonferrous inner frame 220. The two flywheel rotor assemblies 650 may be rotated in counter directions in order to reduce and essentially eliminated gyroscopic effect often observed on a single rotating rotor assembly. The shaft 270 passes through the central holes of the two flywheel rotor assemblies 650 and is supported by a support frame 680. The support frame 680 may be vertical arms or some other support mechanism, such as a housing enclosure. In an alternative embodiment, a portion of the total out power being generated by the dual-rotor electric generator device 600 may be used to power the pulse driver circuits 400.

Signed and Sealed this
Nineteenth Day of November, 2019

Andrei Iancu
*Director of the United States Patent and Trademark Office*